(12) United States Patent  
Hiraki et al.

(10) Patent No.: US 7,498,291 B2  
(45) Date of Patent: Mar. 3, 2009

(54) SUBLIMATION THERMAL TRANSFER IMAGE RECEIVING MEDIUM

(75) Inventors: Soichiro Hiraki, Ichihara (JP); Takashi Kuroda, Ichihara (JP); Taku Kojima, Ichihara (JP)

(73) Assignees: Chisso Corporation, Osaka (JP); Chisso Petrochemical Corporation, Tokyo (JP)

( * ) Notice: Subject to any disclaimer, the term of this patent is extended or adjusted under 35 U.S.C. 154(b) by 494 days.

(21) Appl. No.: 11/452,041

(22) Filed: Jun. 12, 2006

(65) Prior Publication Data

US 2006/0287198 A1    Dec. 21, 2006

(30) Foreign Application Priority Data

Jun. 16, 2005    (JP) .............................. 2005-176142  
Apr. 24, 2006    (JP) .............................. 2006-118702

(51) Int. Cl.  
*B41M 5/035*    (2006.01)  
*B41M 5/50*    (2006.01)

(52) U.S. Cl. .................................... 503/227; 428/32.39

(58) Field of Classification Search ....................... None  
See application file for complete search history.

(56) References Cited

FOREIGN PATENT DOCUMENTS

| JP | 60-245593 | 12/1985 |
|---|---|---|
| JP | 61-112693 | 5/1986 |
| JP | 5-169865 | 7/1993 |
| JP | 7-125453 | 5/1995 |
| JP | 7-257054 | 10/1995 |
| JP | 8-169186 | 7/1996 |
| JP | 8-183263 | 7/1996 |
| JP | 2000-127303 | 5/2000 |

*Primary Examiner*—Bruce H Hess  
(74) *Attorney, Agent, or Firm*—J.C. Patents

(57) ABSTRACT

The present invention provides a sublimation thermal transfer image receiving medium that does not change color development from any viewing direction, have an appropriate gloss and high quality print image when printing with a sublimation thermal transfer printer.

20 Claims, No Drawings

SUBLIMATION THERMAL TRANSFER IMAGE RECEIVING MEDIUM

TECHNICAL FIELD

The present invention relates to a sublimation thermal transfer image receiving medium. More specifically, the invention relates to a sublimation thermal transfer image receiving medium having an appropriate gloss that is capable of high quality and fine printing without largely changing the reflected light by changing angles for the same color development from any viewing direction.

BACKGROUND ART

Thermosensitive transfer recording method is a recording method whereby the ink layer laid on the surface of the substrate film is transferred to the surface of the printing paper by a print head. In this category, since the sublimation thermal transfer method has higher gradation than the fusion thermal transfer method, it has been widely adopted mainly as alternative applications to silver salt picture as an image copy such as video printer, digital camera and digital video.

The sublimation thermal transfer image receiving medium utilizes a plastic sheet, composite sheet of plastic sheet and paper, or synthetic paper. In particular, it is considered that a support of synthetic paper containing voids therein obtained by stretching a polyolefin resin containing inorganic filler powder is preferable due to its opacity and excellent gradation (refer to, for example, JP-S60-245593-A(1985), JP-S61-112693-A(1986), and JP-H8-169186-A(1996)).

Additionally, to obtain high gloss and gradation, several methods are proposed where a thin film surface layer of fine pore layer with the addition of a small amount of inorganic substance or organic crosslinked polymer; or a thin film surface of non-porous layer without the addition of inorganic substance is applied to the surface of the core material layer having an internal lamellar pore layer to act as a support for suppressing surface roughness (refer to, for example, JP-H5-169865-A(1993), JP-H8-183263-A(1996), JP-H7-125453-A(1995), and JP-2000-127303-A). As an alternative application of silver salt picture, it is desired that reflected light is not largely changed by a change in angle for the same color development from any viewing direction. However, there is a problem that reflectance is greatly changed with viewing direction to cause a change of color development for the image receiving medium now being used such as a plastic sheet, composite sheet of plastic sheet and paper, or synthetic paper. To address the problem, although a method for reducing gloss by adding inorganic substance to a surface layer is proposed (refer to, for example, JP-H7-257054-A(1995), there still remains the problem of picture print intensity due to the lowering of gloss.

SUMMARY OF THE INVENTION

An object of the present invention is to provide a sublimation thermal transfer image receiving medium where the color development does not change from any viewing direction and an appropriate gloss and a high quality and fineness of printing when printing with a sublimation thermal transfer printer is maintained.

The present inventors studied thoroughly to solve the foregoing problems. As a result, they discovered a means to solve the above problems and have achieved the present invention on the basis of their findings: A sublimation thermal transfer image receiving medium comprising: a void containing film laminate as a substrate composed of at least one void containing film and
an image receiving layer laid on at least one exposed surface of the void containing film of the substrate,
wherein the void containing film of laminate film is composed of a core layer film (a) consisting of the following resin composition (A) and containing voids; a rear layer film (b) consisting of the following resin composition (B) and essentially containing no voids being laminated on one side of the core layer film (a); and a front layer film (c) consisting of the following resin composition (C) and being laminated on the other side of the core layer film (a) to build the image receiving layer thereon;
wherein the front layer film (c) surface has a gloss at 60° of 50-100% and a gloss ratio between 75° and 45° ranging from 1.0 to 1.9.

The present invention has the following constitution.

(1) A sublimation thermal transfer image receiving medium comprising: a void containing film laminate as a substrate composed of at least one void containing film; and an image receiving layer laid on at least one exposed surface of the void containing film of the substrate,
wherein the void containing film of laminate film is composed of a core layer film (a) consisting of the following resin composition (A) and containing voids; a rear layer film (b) consisting of the following resin composition (B) and essentially containing no voids being laminated on one side of the core layer film (a); and a front layer film (c) consisting of the following resin composition (C) and being laminated on the other side of the core layer film (a) to build the image receiving layer thereon,
wherein the front layer film (c) surface has a glossiness at 60° of 50-100% and a gloss ratio between 75° and 45° ranging from 1.0 to 1.9,
resin composition (A) containing a dicyclopentadiene petroleum resin with a softening point (ring ball method) of 160-200° C. in a range of 5-55 wt % and an inorganic filler powder in a range of 5-55 wt %, and a total content of the dicyclopentadiene petroleum resin and the inorganic filler powder in a range of 15-60 wt % is compounded with a crystalline polypropylene relative to the weight of resin composition;
resin composition (B) containing a crystalline polypropylene; and
resin composition (C) containing titanium dioxide, with a mean particle diameter of 0.1 -0.5 μm, in a range of 5-25 wt % is compounded with a crystalline polypropylene relative to the weight of resin composition.

(2) The sublimation thermal transfer image receiving medium of the foregoing (1) wherein the void containing film is a void containing stretched film stretched biaxially 9 times or more in area after an unstretched film consisting of the resin composition (A) is laminated with a film consisting of the resin composition (B) on its one side and a film consisting of the composition (C) on its other side.

(3) The sublimation thermal transfer image receiving medium of the foregoing (1) or (2) wherein the core layer film (a) has an apparent expansion ratio of 130-250%:

apparent expansion ratio (%)=$(D_A/Da) \times 100$ where $D_A$ is the specific gravity of resin composition (A), and Da is the apparent specific gravity of the core layer film (a).

(4) The sublimation thermal transfer image receiving medium of any one of the foregoing (1) to (3) wherein the void containing film laminate is a laminate of void containing film and paper using the rear layer film (b) surface of the void containing film as an adhesive side.

(5) The sublimation thermal transfer image receiving medium of any one of foregoing (1) to (3) wherein the void containing film laminate is a laminate formed by laminating a void containing film and paper using the rear layer film (b) surface of the void containing film as an adhesive side, further, by applying a paint composition consisting of an inorganic filler added to a synthetic binder or by laminating a polyolefin resin film to the paper.

(6) The sublimation thermal transfer image receiving medium of any one of foregoing (1) to (5) wherein the image receiving layer is a coating of coating agent (image receiving layer forming agent) containing at least one selected resin from saturated or unsaturated polyester resins including copolymers, polycarbonate resins, polyurethane resins, polystyrene resins including copolymers and polyvinyl chloride resins including copolymers.

When printing with a sublimation thermal transfer printer is carried out using a sublimation thermal transfer image receiving medium of the present invention, a picture quality with an appropriate gloss and the same color from any viewing direction is obtained. Additionally, a sublimation thermal transfer image receiving medium using a laminate of void containing film and paper as a substrate is preferably used as an alternative to photographic papers.

BEST MODE FOR CARRYING OUT THE INVENTION

Below, embodiments of the present invention will be described.

The sublimation thermal transfer image receiving medium of the present invention employs a void containing film laminate as a substrate composed of at least one void (micro-void) containing film in order to provide an excellent gloss and the same color development from any viewing direction.

The foregoing void containing film is a void containing film that comprises a core layer film (a) consisting of the resin composition (A) compounded with a crystalline polypropylene and a dicyclopentadiene petroleum resin having a softening point (ring ball method) of 160-200° C. in a range of 5-55 wt % and an inorganic filler powder in a range of 5-55 wt % and a total content of the dicyclopentadiene petroleum resin and the inorganic filler powder in a range of 15-60 wt %; a rear layer film (b) laminated on one side of the core layer film (a), consisting of the resin composition (B) containing a crystalline polypropylene resin and essentially containing no voids being laminated on one side of the core layer film (a); and a front layer film (c) laminated on the other side of the core layer film (a), consisting of the resin composition (C) compounded with a crystalline polypropylene resin and titanium dioxide, with a mean particle diameter of 0.1-0.5 µm, in a range of 5-25 wt %.

The foregoing void containing film is a void containing stretched film obtained by stretching preferably 9 times or more, more preferably 25 times or more in area after each side of an unstretched film consisting of the resin composition (A) is laminated with a film comprising resin composition (B) and a film consisting of the resin composition (C).

For the foregoing void containing film, a crystalline polypropylene resin used in resin composition (A), resin composition (B), and resin composition (C) includes a crystalline homopolymer of propylene; a binary or more complex combinations of crystalline copolymer of propylene with one or more kinds of ethylene or a-olefin with 4 carbon atoms or more; and a mixture thereof. Particularly, the example includes a crystalline polypropylene containing 70 wt % or more of unsolved portion in boiling heptane, preferably 80 wt % or more; propylene copolymer having a crystalline melting point, such as a crystalline ethylene-propylene copolymer containing 70 wt % or more of polymerable propylene component, a crystalline propylene-1-butene copolymer, a crystalline propylene-1-hexene copolymer, and a crystalline ethylene-propylene- 1-butene ternary copolymer.

In addition, a crystalline polypropylene used in composition (A) can be the same as or different from a crystalline polypropylene used in composition (B) or (C), although a propylene homopolymer is preferred for a crystalline polypropylene used in composition (C) from the perspective of gloss. Additionally, the term film used in the present invention represents a generic name of film and sheet.

Melt mass flow rate of crystalline polypropylene used in the present invention is measured according to JIS K 7210 at the test temperature of 230° C. and a nominal load of 2.16 kg (hereinafter referred to as MFR), the MFR being preferably 0.5-20 g/10 min, more preferably 0.5-10 g/10 min.

In the sublimation thermal transfer image receiving medium of the present invention, in order to provide characteristics capable of high quality and fine printing and not largely changing the reflected light by changing the angles for the same color development from any viewing direction, as a core layer film (a) of void containing film, a void (micro-void) containing film is used comprising a resin composition (A) where a dicyclopentadiene petroleum resin with a softening point (ring ball method) of 160-200° C. in a range of 5-55 wt % and inorganic filler powder in a range of 5-55 wt %, and a total content of the dicyclopentadiene petroleum resin and the inorganic filler powder in a range of 15-60 wt % is compounded with a crystalline polypropylene.

A dicyclopentadiene petroleum resin used in resin composition (A) of the present invention has a softening point (ring ball method) of 160-200° C.

When a softening point (ring ball method) of dicyclopentadiene petroleum resin is 160-200° C., its dispersion into a crystalline polypropylene is excellent so that stretching of the unstretched film made of resin composition (A) compounded with the petroleum resin gives a core layer film (a) containing fine and uniform voids.

As a dicyclopentadiene petroleum resin with the foregoing softening point (ring ball method) of 160-200° C., the example that can be used includes: petroleum resin (HR) obtained by polymerization of the fraction in major (most) components of at least one resin selected (hereinafter referred to as cyclopentadiene type component) from cyclopentadiene, dicyclopentadiene, their alkyl derivatives, oligomeres and mixture thereof obtained by steam cracking etc. of petroleum naphtha, a petroleum resin (HSHR) containing 50 wt % or more of cyclopentadiene type component with a high degree of polymerization and high softening point (ring ball method) in a range of 160 to 200° C.; and petroleum resin (HR), hydrogenated dicyclopentadiene petroleum resin (HGHR) containing 50 wt % or more of cyclopentadiene type component with softening point (ring ball method) of 160-200° C. and iodine number of 30 or less, obtained by hydrogenation under a temperature of 150-300° C., hydrogen pressure of 1-15 MPa in the presence of solvent with a metal or metal oxide catalyst such as vanadium, nickel or cobalt.

As an inorganic filler powder compounded in resin composition (A), the example includes calcium carbonate, talc, titanium dioxide and silica of which a mean particle diameter is preferably 0.01-20 µm, more preferably 0.01-10 µm, further preferably 0.1-5 µm, calcium carbonate is advantageous from the point of cost, while titanium dioxide is excellent from the point of hiding power. Two or more kinds of the inorganic filler powder can be used. Use of two or more kinds of inorganic filler powder of different refractive index gives a high opacity to the core layer film (a). Mean particle diameter can be measured, for example, with an image analyzing apparatus based on transmission electron microscopy.

According to the present invention, resin composition (A) is prepared by compounding a crystalline polypropylene with a dicyclopentadiene petroleum resin with a softening point (ring ball method) of 160-200° C. in a range of 5-55 wt %, preferably 10-50 wt % and inorganic filler powder in a range of 5-55 wt %, preferably 10-50 wt %, and a total content of the dicyclopentadiene petroleum resin and the inorganic filler powder is in a range of 15-60 wt %, preferably 20-60 wt %. Within the foregoing range of total content of the dicyclopentadiene petroleum resin and the inorganic filler powder, reflected light is not largely changed by a change in angle, and the receiving medium thus obtained is free of problems where the print image is lost due to a lack of absorbance, color development is reduced, or breakage occurs during stretching of the unstretched film.

In resin compositions (A), (B) and (C), various kinds of known additives can be added to polypropylene if necessary, for example, process stabilizers and antioxidants such as a phenol type, thioether type or phosphorous type, higher fatty acid metal salts like calcium stearate, lubricants such as aliphatic amides, pigments, foaming agents, additive polymers such as polyethylene resins, ethylene-propylene rubbers and petroleum resins can be added in a range as long as the aim of the present invention is not damaged.

Resin compositions (A), (B) and (C) can be prepared by blending a crystalline polypropylene with the additives to be compounded using an ordinary blender or mixer. Additionally, pellets can be prepared by melt blending using an ordinary extruder.

In the present invention, as a method for making a substrate film from resin compositions (A), (B) and (C), for example, unstretched films are obtained by a well-known method such as T-die extrusion forming or inflation extrusion forming, and sequentially stretched by a biaxial stretching machine. Stretching conditions depend on the stretching machine used, with a stretched area that is preferably 9 times or more, more preferably 25 times or more. In addition, a biaxial stretching machine can be of the sequential type or the two stage type.

A void containing film composing a substrate of the sublimation thermal transfer image receiving medium of the present invention has a 60° gloss of the front layer (c) surface of 50-100% and a gloss ratio between 75° and 45° in a range of 1.0-1.9, preferably, 1.0-1.7. Within the foregoing range of gloss, a polypropylene film for the sublimation thermal transfer image receiving medium has an appropriate gloss, the same color development from any viewing direction, reflected light that is not largely changed by a change in angle, and can be preferably used as an alternative to silver salt picture.

For composition (C), in order to control the gloss of the front layer film (c) surface within the foregoing range, a resin composition in which a crystalline polypropylene is compounded with titanium dioxide, with a mean particle diameter of 0.1-0.5 μm, preferably 0.15-0.4 μm, in a range of 5-25 wt %.

Within the foregoing range of titanium dioxide content, over reflection due to excessive gloss values is not observed, lowering of gloss and anisotropy of reflected light is hardly observed. In addition, the particle size distribution of titanium dioxide is preferably in the range of 0.05-3 μm.

A void containing film composing a substrate of the sublimation thermal transfer image receiving medium of the present invention is desired to possess an apparent expansion ratio of the core layer film (a) of 130-250% preferably 140-230%, as represented by the following equation. When an apparent expansion ratio of the core layer film (a) is within the foregoing range, the absorbance characteristic of the substrate is excellent with no fading of the image intensity in printing and no missing of image dots. Additionally, peel strength of the layers between the core layer film (a) and rear layer film (b), or front layer film (c) is sufficiently high such that delamination is minimized.

$$\text{apparent expansion ratio (\%)} = (D_A/Da) \times 100$$

where $D_A$ is the specific gravity of resin composition (A), and $Da$ is the apparent specific gravity of the core layer film (a).

Relating to the void containing film, the thickness of the core layer film (a) is preferably 15-45 μm in relation to absorbance characteristics of the substrate, that of the rear layer film (b) is preferably 1-10 μm in relation to adhesion characteristics to the reinforcing material described below, and that of the front layer film (c) is preferably 1-8 μm in relation to excellent adhesion characteristics to an image receiving layer, high sensitivity and clear print image. In addition, the thickness of the void containing film is preferably 20-60 μm, more preferably 30-50 μm in relation to absorbance characteristics of the substrate.

As a substrate of the sublimation thermal transfer image receiving medium of the present invention, a void containing film laminate laminated with a void containing film and reinforcing material using the rear layer film (b) as an adhesive surface is incorporated. Examples of reinforcing materials are cellulose fibers and plastic films. The foregoing cellulose fibers include quality paper, art paper, coated paper and impregnated paper of synthetic resin or emulsion; the plastic films include films of polyolefin, polyvinyl chloride, PET and polystyrene. Of these, paper is the most common. The thickness of the reinforcing material is preferably 80-250 μm.

Additionally, when both surfaces of the reinforcing material are laminated with void containing films, this permits a void containing film laminate that minimizes curling, and laying image receiving layers on both surfaces provides a double face printable sublimation thermal transfer image receiving medium.

As a substrate of the sublimation thermal transfer image receiving medium of the present invention, a laminate can be used where a void containing film and a reinforcing material are laminated using a rear layer film (b) of the void containing film as an adhesive surface, to prevent curl or improve handling if necessary, further, a paint composition containing an inorganic filler added to a binder, such as clay, calcium carbonate, silica, and titanium dioxide, is applied to the reinforcing surface and dried. As binder, known binders using acrylic resins, urethane resins, polyester resins ethylene-vinyl acetate copolymers can be used but not limited thereto.

To form a coating by applying the paint composition, it is necessary to dry at a suitable temperature after the coating is applied. The application method is not particularly limited thereto, known methods and equipment, such as a gravure coater equipped with heater and drying sections can be used.

Additionally, instead of applying the foregoing paint composition, polyolefin films such as polypropylene film may be laminated by an extrusion lamination method. The thickness of the coating of the paint composition or the film is preferably 10-40 μm.

In a substrate of the sublimation thermal transfer image receiving medium of the present invention, an image receiving layer is formed on at least one surface of the exposed surface (front layer film (c)) of the void containing film of the substrate. As an image receiving layer, an image receiving layer is a synthetic resin layer capable of having a sufficient dyeing-capacity with sublimation dye, the example includes saturated or unsaturated polyester resins or copolyesters of polycondensate of dicarbolic acid component with a diol group, of polycondensate of at least one dicarbolic acid or diol group having at least 2 or more kinds of groups; polycarbonate resins; polyurethane resins; polystyrene resins such as polystyrene homopolymer or copolymers of styrene-acrylic; or polyvinyl chloride resins such as polyvinyl chloride homopolymer or copolymers of vinyl chloride-vinyl acetate. These resins can be used alone or in combination of 2 or more kinds thereof.

As a method for forming an image receiving layer, a method is exemplified; crosslinking agents of synthetic resin to prevent melt-adhesion in printing, release agents, pigments, and the like are added to the above synthetic resins, if necessary, to thereby prepare a coating agent (an image receiving layer forming agent), the coating agent is applied to the front layer film (c) surface of the void containing film, and then dried at a suitable temperature. The application method is not particularly limited thereto, known methods and equipment, such as a gravure coater equipped with heater and drying sections can be used. The thickness of the image receiving layer is preferably 2-10 μm.

In addition, the thickness of the sublimation thermal transfer image receiving medium of the present invention is not particularly limited thereto, 120-360 μm is exemplified.

Additionally, in order that a coating of the image receiving layer forming agent adheres sufficiently to the front layer film (c) surface, as a method for improving the wetting of the front layer film (c) surface, known methods such as corona treatment, plasma treatment and flame treatment can be used.

In addition, as a method for improving adhesion of the rear layer film (b) surface, known methods such as corona treatment, plasma treatment and flame treatment can be used.

In the present invention, when the sublimation thermal transfer image receiving medium of the void containing film laminate as a substrate is produced, after the substrate is produced, an image receiving layer may be formed on at least one surface of the exposed surface (front layer film (c)) of the void containing film of the substrate, or reinforcing material may be laminated on the rear layer film (b) of the void containing film after an image receiving layer is preformed on the exposed surface (front layer film (c)).

EXAMPLES

Below, the present invention will be specifically described with reference to Examples and Comparative examples, however, the present invention is not to be limited thereto. Additionally, evaluation methods used in Examples and Comparative examples are as follows.

(1) Gloss

According to ASTM D 523, using a digital glossmeter GM-3D (trade name, manufactured by Murakami Color Research Laboratory), gloss at a support angle of 45°, 60° and 75° was measured to calculate the gloss value at 75°/45°. Additionally, a naked eye visual evaluation was performed according to the following criteria.

○: confirm sufficient gloss and uniformity of gloss (practicability satisfied)

x: low or excessive gloss causing glare, gloss is uneven (practicability not satisfied)

(2) Apparent expansion ratio

Apparent expansion ratio of the core layer film (a) (%)=$(D_A/Da)\times 100$ where $D_A$ is the specific gravity of resin composition (A), and Da is the apparent specific gravity of the core layer film (a).

Additionally, resin composition (A) of the void containing stretched film was measured for $D_A$ to calculate the average (n=3) using an automatic specific gravimeter (manufactured by Toyo Seiki Seisaku-Sho Ltd.). Void containing laminate stretched film and front layer film after the front layer film was peeled off from the void containing laminate stretched film were measured for Da, each film was cut into 4 pieces using a mould of 0.05 m², weighed and using a dial gauge (Ozaki MFG. Co., Ltd.), each of 4 samples was measured for thickness at 5 points, an average thickness of 20 points in total was measured, being divided by which an apparent specific gravity was calculated. Then, an apparent specific gravity of the core layer film of void containing laminate stretched film was calculated by the following equation:

$$Da=\{(Ds\times Ts)-(Db\times Tb+Dc\times Tc)\}/(Ts-Tb-Tc)$$

where Da is the apparent specific gravity of the core layer film (a), Ds is the apparent specific gravity of the void containing laminate stretched film, Ts is the thickness (in μm) of the void containing laminate stretched film, Db is the apparent specific gravity of rear layer film (b), Tb is the thickness (in μm) of the rear layer film (b), Dc is the apparent specific gravity of the front layer film (c), and Tc is the thickness (in μm) of the front layer film (c).

(3) Print Quality

Using a sublimation thermal transfer color printer Easy Share Printer Dock (trade name, manufactured by KODAK Ltd.), print images on single colors cyan, magenta and yellow, and a mixture of 3 colors were printed. The print was visually evaluated by naked eye for intensity of the printed image, uniformity, missing dots of the printed image, and assessed by the following criteria.

○: print image is clear and intensity is uniform, and free from missing dots (practicability satisfied)

x: print image is not clear and intensity is not uniform, with partial occurrence of missing dots (practicability not satisfied)

Example 1

[Preparation of Resin Composition (A)]

As resin composition (A) for the core layer film, to a crystalline polypropylene powder with 96 wt % of boiling heptane unsolved portion and MFR of 2 g/10 min, relative to the weight of resin composition, were added 0.2 wt % of phenol type antioxidant BHT, 0.1 wt % of calcium stearate, 12 wt % of cyclopentadiene petroleum resin (hereinafter referred to as DCPD) with softening point of 172° C., 12 wt % of calcium carbonate (trade name SST-40, manufactured by Calfine Co., Ltd., mean particle diameter of 1.1 μm), and 7 wt % of titanium dioxide (trade name CR-60-2, manufactured Ishihara Sangyo Kaisha Ltd., mean particle diameter of 0.21 μm), these are fed into a Henschel mixer (trade name) and blended, then fed into a twin screw extruder of same direction rotating type, melt-blended at 240° C. to extrude strands which are cooled and cut to pellets of resin composition (A).

[Preparation of Resin Composition (B)]

As resin composition (B) for rear layer film, to a crystalline polypropylene powder with 96 wt % of boiling heptane unsolved portion and MFR of 2 g/10 min, relative to the weight of resin composition, were added 0.2 wt % of phenol type antioxidant BHT, 0.1 wt % of calcium stearate, these are fed into a Henschel mixer (trade name) and blended, then fed into a twin screw extruder of same direction rotating type, melt-blended at 240° C. to extrude strands which are cooled and cut to pellets of resin composition (B).

[Preparation of Resin Composition (C)]

As resin composition (C) for front layer film, to a crystalline polypropylene powder with 96 wt % of boiling heptane unsolved portion and MFR of 2 g/10 min, relative to the weight of resin composition, were added 0.2 wt % of phenol type antioxidant BHT, 0.1 wt % of calcium stearate, and 20 wt % of titanium dioxide (average particle diameter of 0.2 μm), these are fed into a Henschel mixer (trade name) and blended, then fed into a twin screw extruder of same direction rotating type, melt-blended at 240° C. to extrude strands which are cooled and cut to pellets of resin composition (C).

[Preparation of Void Containing Laminate Stretched Film]

Using a 3-kind 3-layer film extruder equipped with a multilayer T die (extruder: one single-screw extruder with 65 mm bore diameter for core layer, and each one of single-screw extruders with 50 mm bore diameter for rear layer and front layer) and a biaxial stretching machine of tenter method, the foregoing resin composition (A) was fed into a single-screw extruder for the core layer, the resin composition (B) was fed into a single-screw extruder for the rear layer, and the resin composition (C) was fed into a single-screw extruder for the front layer, these were melted and coextruded with the T die at 240° C., rapidly cooled with a mirror-finished cooling roller with a surface temperature of 30° C. to give a 3-kind 3-layer unstreched film constituting front layer/core layer/rear layer.

The thus obtained unstretched film was introduced to a vertical stretching machine, stretched 5 times in the machine direction (MD) between heating rolls at 140° C., then, stretched 8 times in the transverse direction (TD) in the tenter at 160-210° C., followed by winding, to thereby give a sample of void containing laminate stretched film with a total thickness of 40 μm (core layer film of 32 μm, rear film of 4 μm, and front film of 4 μm). The apparent expansion ratio of the core layer film in this film was 190%.

[Evaluation Test]

Corona treatment of 42 watt·min/m² was performed to both sides of the film, on the rear layer film (b) surface, quality paper (140 μm thick) was laminated with a urethane type adhesive, then to the front layer film (c) surface, an image receiving layer forming agent composed of a mixture of 75 wt % of mixed solvent (toluene/methyl ethyl ketone=50/50 by weight), 24 wt % of saturated polyester resin Vylon 200 (trade name, manufactured by Toyobo Ltd.) and 1 wt % of amino-modified silicone was applied, dried at 120° C. for 1 minute, thereby to give an image receiving layer with a coating of 8 μm, from which a sublimation thermal-transfer image receiving medium (190 μm thick) was prepared, after being placed at 40° C. for 24 hours, evaluated for print quality. The results are shown in Table 1.

Example 2

A sublimation thermal transfer image receiving medium was prepared according to the method in Example 1 except that DCPD, calcium carbonate and titanium dioxide in resin composition (A) were changed to the variation of composition in resin composition (A) shown in Table 1. The results are shown in Table 1.

Examples 3, 4, 5, 6, 7, and 8

A sublimation thermal transfer image receiving medium was prepared according to the method in Example 1 except that DCPD, calcium carbonate and titanium dioxide in resin composition (A); and titanium dioxide in resin composition (C) were changed to the variations of composition in resin composition (A) and resin composition (C) shown in Table 1. The results are shown in Table 1.

Comparative Example 1

A sublimation thermal transfer image receiving medium was prepared according to the method in Example 1 except that DCPD, calcium carbonate and titanium dioxide in resin composition (A) were changed to the variation of composition in resin composition (A) shown in Table 1. The results are shown in Table 1.

Comparative Examples 2, 3, 4, 5, and 6

A sublimation thermal transfer image receiving medium was prepared according to the method in Example 1 except that DCPD, calcium carbonate and titanium dioxide in resin composition (A); and titanium dioxide in resin composition (C) were changed to the variations of composition in resin composition (A) and resin composition (C) shown in Table 1. The results are shown in Table 1.

The invention can be used as a printing medium for sublimation thermal transfer printing.

TABLE 1

| | Example 1 | Example 2 | Example 3 | Example 4 | Example 5 | Example 6 | Example 7 | Example 8 |
|---|---|---|---|---|---|---|---|---|
| Variation of composition in resin composition (A) (wt %) | | | | | | | | |
| Dicyclopentadiene petroleum resin | 12 | 10 | 25 | 12 | 15 | 15 | 15 | 15 |
| Calcium carbonate | 12 | 10 | 25 | 12 | 5 | 5 | 5 | 5 |
| Titanium dioxide | 7 | 0 | 5 | 7 | 0 | 0 | 0 | 0 |
| Variation of composition in resin composition (C) (wt %) | | | | | | | | |
| Titanium dioxide | 20 | 20 | 10 | 10 | 5 | 10 | 20 | 25 |
| Thickness of rear layer film (b) (μm) | 4 | 4 | 4 | 4 | 4 | 4 | 4 | 4 |
| Thickness of front layer film (c) (μm) | 4 | 4 | 4 | 4 | 4 | 4 | 4 | 4 |
| Thickness of core layer film (a) (μm) | 32 | 32 | 32 | 32 | 32 | 32 | 32 | 32 |
| Thickness of void containing film (a) + (b) + (c) (μm) | 40 | 40 | 40 | 40 | 40 | 40 | 40 | 40 |
| Thickness of image receiving layer (μm) | 8 | 8 | 8 | 8 | 8 | 8 | 8 | 8 |

TABLE 1-continued

|  | | | | | | | | |
|---|---|---|---|---|---|---|---|---|
| Thickness of reinforcing material (paper) (μm) | 140 | 140 | 140 | 140 | 140 | 140 | 140 | 140 |
| Thickness of sublimation thermal transfer image receiving medium (μm) | 190 | 190 | 190 | 190 | 190 | 190 | 190 | 190 |
| Apparent expansion ratio of core layer film (a) (%) | 220 | 154 | 228 | 218 | 168 | 169 | 175 | 171 |
| Glossiness of front layer film (c) (%) | | | | | | | | |
| Gloss at 45° | 65.5 | 63.6 | 56.4 | 68.6 | 101.6 | 84.5 | 72.6 | 59.1 |
| Gloss at 60° | 75.5 | 77.2 | 67.9 | 82.5 | 99.6 | 83.3 | 80.4 | 65.9 |
| Gloss at 75° | 91.3 | 92.7 | 93.3 | 96.2 | 109 | 102.5 | 96.7 | 92.5 |
| Gloss at 75°/Gloss at 45° | 1.39 | 1.46 | 1.65 | 1.40 | 1.07 | 1.21 | 1.33 | 1.56 |
| Judgment | | | | | | | | |
| Appropriate gloss (60?direction) | ○ | ○ | ○ | ○ | ○ | ○ | ○ | ○ |
| Uniformity of gloss | ○ | ○ | ○ | ○ | ○ | ○ | ○ | ○ |
| Print quality of sublimation thermal transfer image receiving medium | ○ | ○ | ○ | ○ | ○ | ○ | ○ | ○ |

|  | Comparative Example 1 | Comparative Example 2 | Comparative Example 3 | Comparative Example 4 | Comparative Example 5 | Comparative Example 6 |
|---|---|---|---|---|---|---|
| Variation of composition in resin composition (A) (wt %) | | | | | | |
| Dicyclopentadiene petroleum resin | 3 | 25 | 12 | 15 | 15 | 0 |
| Calcium carbonate | 3 | 25 | 12 | 5 | 5 | 30 |
| Titanium dioxide | 0 | 5 | 7 | 0 | 0 | 0 |
| Variation of composition in resin composition (C) (wt %) | | | | | | |
| Titanium dioxide | 20 | 30 | 30 | 0 | 35 | 20 |
| Thickness of rear layer film (b) (μm) | 4 | 4 | 4 | 4 | 4 | 4 |
| Thickness of front layer film (c) (μm) | 4 | 4 | 4 | 4 | 4 | 4 |
| Thickness of core layer film (a) (μm) | 32 | 32 | 32 | 32 | 32 | 32 |
| Thickness of void containing film (a) + (b) + (c) (μm) | 40 | 40 | 40 | 40 | 40 | 40 |
| Thickness of image receiving layer (μm) | 8 | 8 | 8 | 8 | 8 | 8 |
| Thickness of reinforcing material (paper) (μm) | 140 | 140 | 140 | 140 | 140 | 140 |
| Thickness of sublimation thermal transfer image receiving medium (μm) | 190 | 190 | 190 | 190 | 190 | 190 |
| Apparent expansion ratio of core layer film (a) (%) | 115 | 242 | 222 | 170 | 181 | 265 |
| Glossiness of front layer film (c) (%) | | | | | | |
| Gloss at 45° | 58.2 | 40.2 | 42.1 | 146.4 | 45.3 | 37.1 |
| Gloss at 60° | 69.5 | 45.7 | 56.4 | 133.6 | 60.5 | 66.9 |
| Gloss at 75° | 93.2 | 80.7 | 83.6 | 137.3 | 88.5 | 94.1 |
| Gloss at 75°/Gloss at 45° | 1.60 | 2.01 | 1.99 | 0.94 | 1.95 | 2.54 |
| Judgment | | | | | | |
| Appropriate gloss (60?direction) | ○ | x | ○ | x | ○ | ○ |
| Uniformity of gloss | ○ | x | x | ○ | x | x |
| Print quality of sublimation thermal transfer image receiving medium | x | ○ | ○ | ○ | ○ | x |

The invention claimed is:

1. A sublimation thermal transfer image receiving medium comprising:
    a void containing film laminate as a substrate composed of at least one void containing film; and
    an image receiving layer laid on at least one exposed surface of the void containing film of the substrate;
    wherein the void containing film of the laminate film is composed of a core layer film (a) consisting of the following resin composition (A) and containing voids; a rear layer film (b) consisting of the following resin composition (B) and essentially containing no voids being laminated on one side of the core layer film (a); and a front layer film (c) consisting of the following resin composition (C) and being laminated on the other side of the core layer film (a) to build the image receiving layer thereon;
    wherein the front layer film (c) surface has a gloss at 60° of 50-100% and a gloss ratio between 75° and 45° ranging from 1.0 to 1.9,
    resin composition (A) comprising a dicyclopentadiene petroleum resin with a softening point (ring ball method) of 160-200° C. in a range of 5-55 wt % and an inorganic filler powder in a range of 5-55 wt %, and a total content of the dicyclopentadiene petroleum resin and the inorganic filler powder in a range of 15-60 wt % is compounded with a crystalline polypropylene relative to the weight of resin composition;
    resin composition (B) comprising a crystalline polypropylene; and resin composition (C) comprising titanium dioxide, with a mean particle diameter of 0.1-0.5 μm, in a range of 5-25 wt % is compounded with a crystalline polypropylene relative to the weight of resin composition.

2. The sublimation thermal transfer image receiving medium of claim 1 wherein the void containing film is a void containing stretched film stretched biaxially 9 times or more in area after an unstretched film consisting of the resin composition (A) is laminated with a film consisting of the resin composition (B) on its one side and a film consisting of the resin composition (C) on its other side.

3. The sublimation thermal transfer image receiving medium of claim 2 wherein the core layer film (a) has an apparent expansion ratio of 130-250%:

apparent expansion ratio (%)=$(D_A/Da) \times 100$ where $D_A$ is the specific gravity of the resin composition (A), and Da is the apparent specific gravity of the core layer film (a).

4. The sublimation thermal transfer image receiving medium of claim 3 wherein the void containing film laminate is a laminate of void containing film and paper using the rear layer film (b) surface of the void containing film as an adhesive side.

5. The sublimation thermal transfer image receiving medium of claim 3 wherein the void containing film laminate is a laminate formed by laminating a void containing film and paper using the rear layer film (b) surface of the void containing film as an adhesive side, further, by applying a paint composition consisting of an inorganic filler added to a synthetic binder or by laminating a polyolefin resin film to the paper.

6. The sublimation thermal transfer image receiving medium of claim 3 wherein the image receiving layer is a coating of coating agent containing at least one selected resin from saturated or unsaturated polyester resins including copolymers, polycarbonate resins, polyurethane resins, polystyrene resins including copolymers and polyvinyl chloride resins including copolymers.

7. The sublimation thermal transfer image receiving medium of claim 2 wherein the void containing film laminate is a laminate of void containing film and paper using the rear layer film (b) surface of the void containing film as an adhesive side.

8. The sublimation thermal transfer image receiving medium of claim 7 wherein the image receiving layer is a coating of coating agent containing at least one selected resin from saturated or unsaturated polyester resins including copolymers, polycarbonate resins, polyurethane resins, polystyrene resins including copolymers and polyvinyl chloride resins including copolymers.

9. The sublimation thermal transfer image receiving medium of claim 2 wherein the void containing film laminate is a laminate formed by laminating a void containing film and paper using the rear layer film (b) surface of the void containing film as an adhesive side, further, by applying a paint composition consisting of an inorganic filler added to a synthetic binder or by laminating a polyolefin resin film to the paper.

10. The sublimation thermal transfer image receiving medium of claim 2 wherein the image receiving layer is a coating of coating agent containing at least one selected resin from saturated or unsaturated polyester resins including copolymers, polycarbonate resins, polyurethane resins, polystyrene resins including copolymers and polyvinyl chloride resins including copolymers.

11. The sublimation thermal transfer image receiving medium of claim 1 wherein the core layer film (a) has an apparent expansion ratio of 130-250%:

apparent expansion ratio (%)=$(D_A/Da) \times 100$ where $D_A$ is the specific gravity of the resin composition (A), and Da is the apparent specific gravity of the core layer film (a).

12. The sublimation thermal transfer image receiving medium of claim 11 wherein the void containing film laminate is a laminate of void containing film and paper using the rear layer film (b) surface of the void containing film as an adhesive side.

13. The sublimation thermal transfer image receiving medium of claim 12 wherein the image receiving layer is a coating of coating agent containing at least one selected resin from saturated or unsaturated polyester resins including copolymers, polycarbonate resins, polyurethane resins, polystyrene resins including copolymers and polyvinyl chloride resins including copolymers.

14. The sublimation thermal transfer image receiving medium of claim 11 wherein the void containing film laminate is a laminate formed by laminating a void containing film and paper using the rear layer film (b) surface of the void containing film as an adhesive side, further, by applying a paint composition consisting of an inorganic filler added to a synthetic binder or by laminating a polyolefin resin film to the paper.

15. The sublimation thermal transfer image receiving medium of claim 11 wherein the image receiving layer is a coating of coating agent containing at least one selected resin from saturated or unsaturated polyester resins including copolymers, polycarbonate resins, polyurethane resins, polystyrene resins including copolymers and polyvinyl chloride resins including copolymers.

16. The sublimation thermal transfer image receiving medium of claim 1 wherein the void containing film laminate is a laminate of void containing film and paper using the rear layer film (b) surface of the void containing film as an adhesive side.

17. The sublimation thermal transfer image receiving medium of claim 16 wherein the image receiving layer is a coating of coating agent containing at least one selected resin from saturated or unsaturated polyester resins including copolymers, polycarbonate resins, polyurethane resins, polystyrene resins including copolymers and polyvinyl chloride resins including copolymers.

18. The sublimation thermal transfer image receiving medium of claim 1 wherein the void containing film laminate is a laminate formed by laminating a void containing film and paper using the rear layer film (b) surface of the void containing film as an adhesive side, further, by applying a paint composition consisting of an inorganic filler added to a synthetic binder or by laminating a polyolefin resin film to the paper.

19. The sublimation thermal transfer image receiving medium of claim 18 wherein the image receiving layer is a coating of coating agent containing at least one selected resin from saturated or unsaturated polyester resins including copolymers, polycarbonate resins, polyurethane resins, polystyrene resins including copolymers and polyvinyl chloride resins including copolymers.

20. The sublimation thermal transfer image receiving medium of claim 1 wherein the image receiving layer is a coating of coating agent containing at least one selected resin from saturated or unsaturated polyester resins including copolymers, polycarbonate resins, polyurethane resins, polystyrene resins including copolymers and polyvinyl chloride resins including copolymers.

* * * * *